United States Patent [19]

Tsunefuji

[11] 4,171,156
[45] Oct. 16, 1979

[54] ELECTROMAGNETIC SHUTTER APPARATUS FOR CAMERA

[75] Inventor: Katsuhiko Tsunefuji, Hachioji, Japan

[73] Assignee: Olympus Optical Co., Ltd., Tokyo, Japan

[21] Appl. No.: 892,732

[22] Filed: Apr. 3, 1978

[30] Foreign Application Priority Data

Apr. 5, 1977 [JP] Japan .............................. 52-39242
Apr. 20, 1977 [JP] Japan .............................. 52-45567
Apr. 20, 1977 [JP] Japan .............................. 52-45568
Apr. 20, 1977 [JP] Japan .............................. 52-45569

[51] Int. Cl.² .................... G03B 7/38; G03B 19/02
[52] U.S. Cl. ............................. 354/209; 354/268
[58] Field of Search ............... 354/207, 208, 209, 266, 354/268, 204

[56] References Cited

U.S. PATENT DOCUMENTS 4,057,814 11/1977 Grunbacker et al. ............. 354/207

Primary Examiner—Michael L. Gellner
Attorney, Agent, or Firm—Lerner, David, Littenberg & Samuel

[57] ABSTRACT

An electromagnetic shutter apparatus for a camera includes a first and a second notched disc which are adapted to rotate in response to a film winding operation, a resilient member operatively connecting the notched discs, and a detent member capable of engaging with and disengaging from the second disc in response to a shutter operation. The detent member prevents an inadvertent operation from occurring during a film winding and a shutter release operation. The apparatus also comprises an unlocking member which unlocks a film winding mechanism in ganged relationship with a shutter drive member which is electromagnetically driven to open the shutter, and a constraining member which can be moved into engagement with the unlocking member in response to an external operation to thereby prevent the unlock operation, thus permitting a desired multiple exposure process.

5 Claims, 21 Drawing Figures

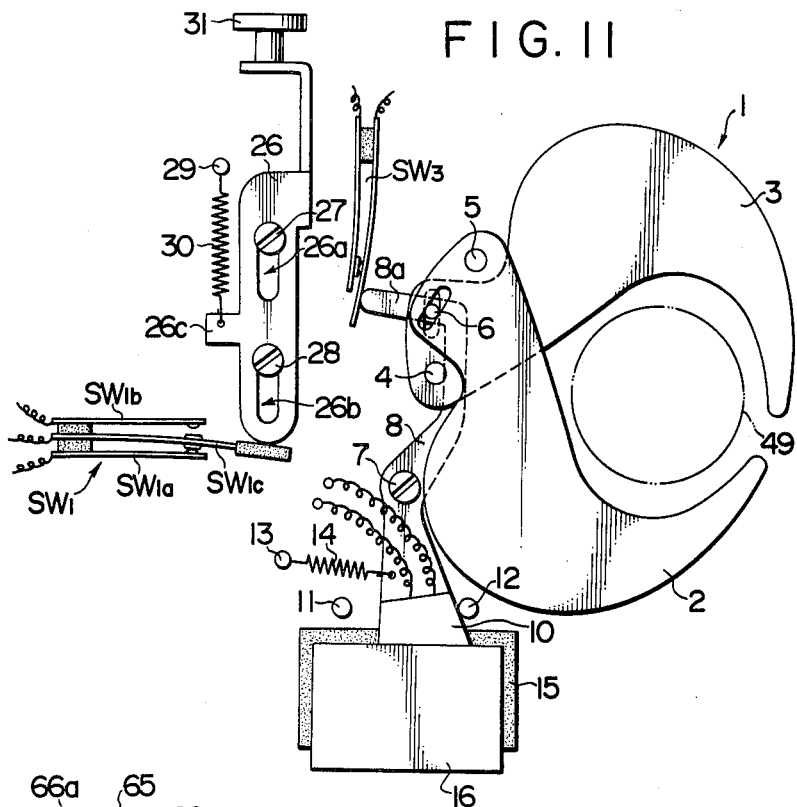
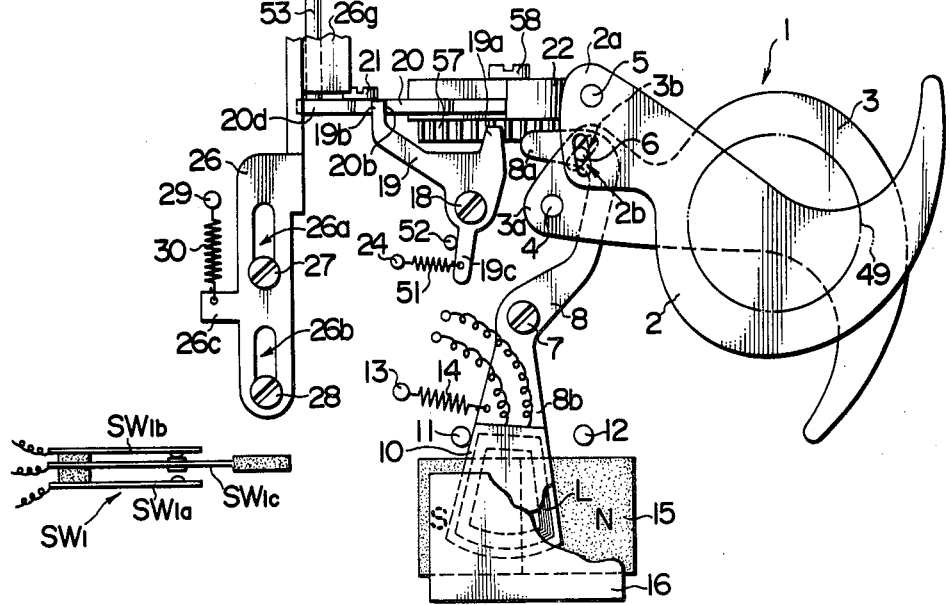

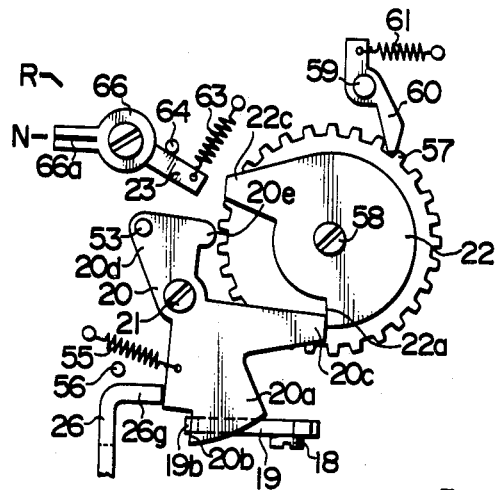
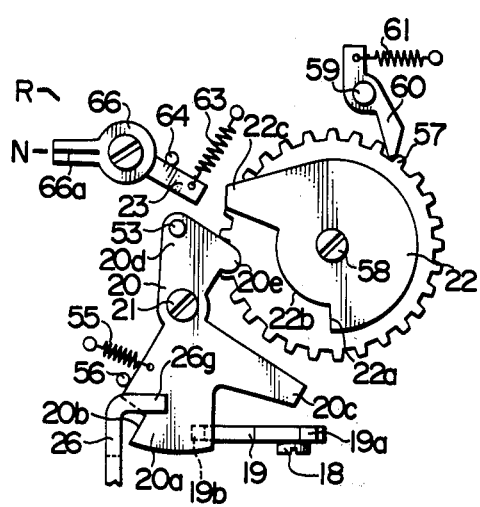
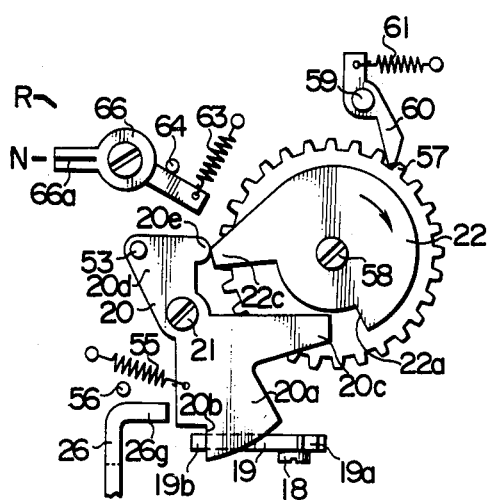

ELECTROMAGNETIC SHUTTER APPARATUS FOR CAMERA

BACKGROUND OF THE INVENTION

The invention relates to an electromagnetic shutter apparatus for a camera, and more particularly, to a shutter control apparatus for an electromagnetically driven shutter which prevents an inadvertent operation during a film winding and a shutter release operation and which permits a desired multiple exposure process.

A shutter mechanism in a conventional camera generally comprises mechanical parts such as levers, cams and the like, and they can be utilized to prevent an inadvertent operation such as a shutter release during a film winding operation, a double exposure, a film winding during a shutter release operation or the inadvertent winding of unexposed film. In a shutter mechanism of the type which is electromagnetically driven, a simple electrical arrangement to turn a switch on and off is all that is required to control the electromagnetic operation. Therefore, it is very difficult to utilize such arrangement to achieve the prevention of above described inadvertent operations.

In an electromagnetic shutter of the type which is contemplated by the present invention, the shutter is directly driven by the electromagnetic action of a permanent magnet and a shutter driving coil. This permits a simple construction, enabling a simplification of the assembling operation and a minimized overall size. On the other hand, movement of the shutter is slow when it is opened, rendering it unsuitable to taking pictures at high speed. While it may be contemplated to increase the source voltage to produce an increased electromagnetic force, there results an increased power dissipation, involving an economical difficulty.

The electromagnetic shutter is controlled by a time constant circuit including a light receiving element and which automatically determines a proper exposure period. Specifically, a shutter drive coil is energized in response to a shutter release operation, and the electromagnetic action between the flux from the coil and the permanent magnet serves to open the shutter. The time constant circuit comprises an integrator circuit including a photometric element and a capacitor and in which values of a diaphragm aperture, film speed, etc., are incorporated. When the output of the circuit, which corresponds in magnitude to the brightness of an object being photographed, reaches a given value subsequent to the release operation, the circuit is effective to deenergize the drive coil, allowing the shutter to close. With this arrangement, a shutter operation may sometimes be impossible when taking a picture in a short exposure period, depending on the setting of the diaphragm aperture and the film speed. Thus, the time during which the drive coil is energized is too short to open the shutter, resulting in a failure to provide an exposure.

A presently used ordinary camera is provided with a self-cocking assembly which is constructed to disable the next shutter release operation before a film winding takes place after a picture has been taken. Thus, the self-cocking assembly represents an interconnection between a shutter release mechanism and a film winding mechanism, and winding of the film thereby charges the shutter. This presents a difficulty when a multiple exposure is desired. In this instance, the connection between the film winding mechanism and a spool on which the film is disposed must be interrupted subsequent to the shutter release operation, and the film winding mechanism once activated for an idle operation under this condition, before a second shutter release operation can be achieved to expose the same frame of the film. However, the operation involved is very cumbersome, and the interruption of the connection between the winding mechanism and the spool may result in a slight movement of the spool, preventing a second exposure to the same exact frame of the film.

A camera incorporating an electromagnetic shutter has no shutter charging mechanism which is interlocked with the film winding operation since the operation of the shutter takes place under the electromagnetic effect. However, there still is a connection between the film winding mechanism and the shutter release mechanism, preventing a next following shutter release unless a film winding takes place beforehand. Consequently, there is a need to provide some means which interrupts the connection between the film winding mechanism and the shutter release mechanism while avoiding an unintended movement of the film in order to permit a multiple exposure.

SUMMARY OF THE INVENTION

It is a first object of the invention to provide a film winding and shutter release control apparatus for use in an electromagnetic shutter apparatus for camera, which comprises a pair of notched discs which are connected together by means of a resilient member so that they can be selectively operated during a film winding and a shutter operation, thereby preventing inadvertent operations such as a shutter release during the film winding, a double exposure, a film winding during the shutter release and the winding of an unexposed film.

It is a second object of the invention to provide a shutter drive circuit for an electromagnetic shutter apparatus in which the shutter is directly driven by the electromagnetic interaction between a permanent magnet and a shutter drive coil, the circuit supplying an increased current flow to the coil at the initiation of movement of the shutter to stabilize the shutter operation.

It is a third object of the invention to provide a shutter drive and control circuit for an electromagnetic shutter apparatus for cameras which apparatus avoids the failure of exposure by assuring the opening of the shutter even when the exposure period is very short.

It is a fourth object of the invention to provide a multiple exposure apparatus for cameras incorporating an electromagnetic shutter in which the connection between a film winding mechanism and a shutter release mechanism is interrupted while maintaining the film being exposed stationary, thus permitting a repeated exposure on the same film surface.

The film winding and shutter release control apparatus of the invention is capable of completely avoiding the described inadvertent operations even with a shutter such as an electromagnetic shutter which does not produce a positively defined operate signal.

The shutter drive circuit of the invention includes a capacitor connected through a resistor with a d.c. source and across which a shutter drive coil and switching element are connected in series to permit an increased current flow to be supplied to the coil at the commencement of the shutter operation, thus assuring a rapid shutter opening operation, in particular, when the exposure period is short. Since there is no need to increase the source voltage, an increased power dissipation is avoided. In this manner, a disadvantage of the prior art electromagnetic shutter involving a slow movement of the shutter when it is being opened is eliminated.

The shutter drive and control circuit of the invention operates to deenergize the shutter drive coil to close the shutter in response to either a shutter open signal from a switch which is operated as the shutter is opened or to a voltage level signal from a time constant circuit whichever occurs later in time. This assures that the shutter be opened even for a reduced exposure period, avoiding the failure of exposure. While this may represent an overexposure, it is nevertheless better than the failure of exposure.

The multiple exposure apparatus of the invention includes a constraining member which may be selectively brought to an angular position in which it interrupts the connection between the film winding mechanism and the shutter release manner in an optimum manner, permitting a repeated exposure on the same film surface while maintaining the film stationary. The constraining member is urged to return to its original position, preventing an inadvertent multiple exposure unless the multiple exposure is intentionally desired. The constraining member can be temporarily retained in its operative position, permitting the multiple exposure to be continued by remote control even when the constraining member is released.

BRIEF DESCRIPTION OF THE DRAWINGS

FIG. 11 is a front view of the apparatus shown in FIG. 10, illustrating the operative condition thereof;

FIG. 13 is a front view of the electromagnetic shutter apparatus including the multiple exposure apparatus of the invention;

FIGS. 15 to 19 are plan views illustrating the various phases of operation of the apparatus shown in FIG. 13;

DESCRIPTION OF PREFERRED EMBODIMENTS

Figure 1:
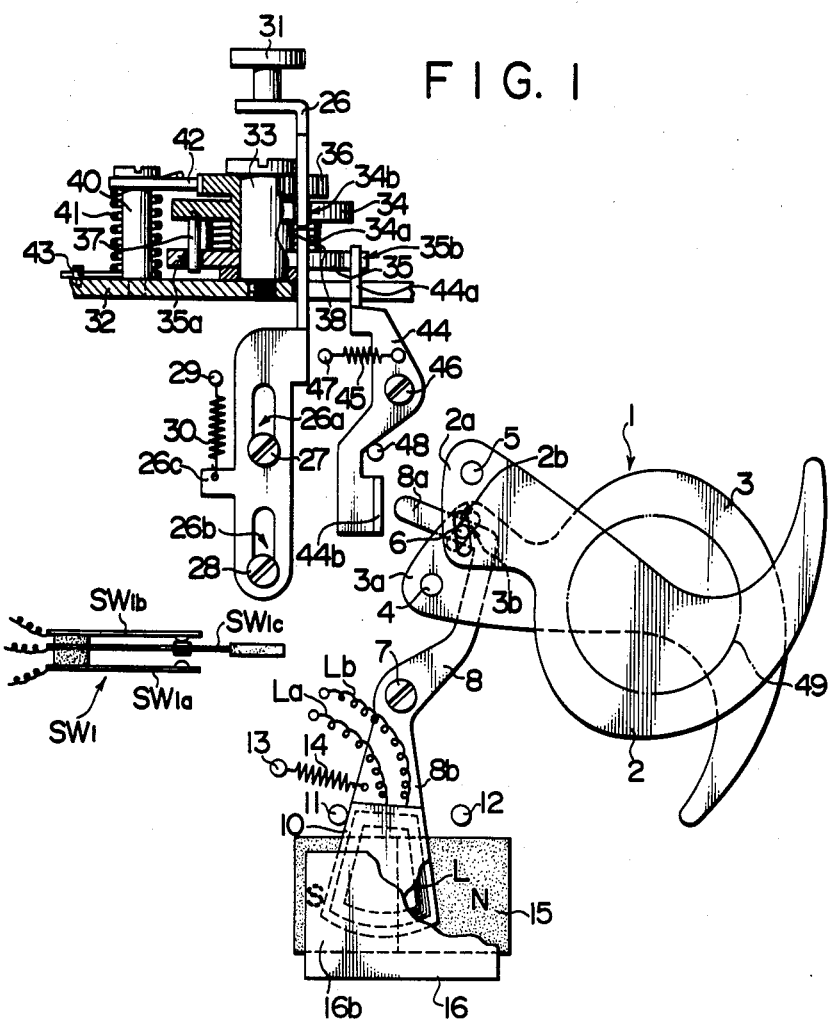
FIG. 1 is a front view of a film winding and shutter release control apparatus contained in the electromagnetic shutter apparatus of the invention.
Figure 2:
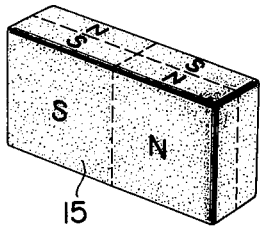
FIG. 2 is a perspective view of a permanent magnet used in the arrangement of FIG. 1.

FIGS. 1 to 5 show the arrangement of a film winding and shutter release control apparatus which is used in the electromagnetic shutter apparatus of the invention. Referring to FIG. 1, a bladed shutter 1 comprises a pair of sickle-shaped shutter blades 2, 3, which are pivotally mounted on pins 4, 5 at their one end 2a, 3a. The ends 2a, 3a are formed with elongated slots 2b, 3b which cross each other and into which a pin 6 is slidably fitted. A shaft 7 pivotally mounts a shutter drive member 8 in the form of a lever, and the pin 6 is fixedly mounted on the end 8a of one arm thereof. The drive member 8 includes another arm, the end of which fixedly carries a case 10 which internally houses a shutter drive coil L. A pair of stop pins 11, 12 are located on opposite sides of the end 8b so as to limit the extent of the angular movement of the drive member 8. A coiled spring 14 extends between the end 8b and a stationary pin 13 to urge the drive member 8 to rotate clockwise about the shaft 7. As a consequence, the end 8b is maintained in abutment against the left-hand pin 11. The case 10 is opposed by a permanent magnet 15 (see FIG. 2), which is secured to the interior side of one wall 16a of a yoke 16 (see FIG. 3), which is U-shaped in side elevation. The case 10 is located between the permanent magnet 15 and the other wall 16b of the yoke 16, and under the condition shown in FIG. 1, it is disposed so that the coil L is disposed in opposing relationship with one pole, namely, S-pole, of the permanent magnet 15. The opposite ends La, Lb of the coil are taken out of the case 10, with the end La being connected with the positive terminal of a power source E through a main switch SW2 contained in the shutter drive and control circuit 9.

Figure 8:
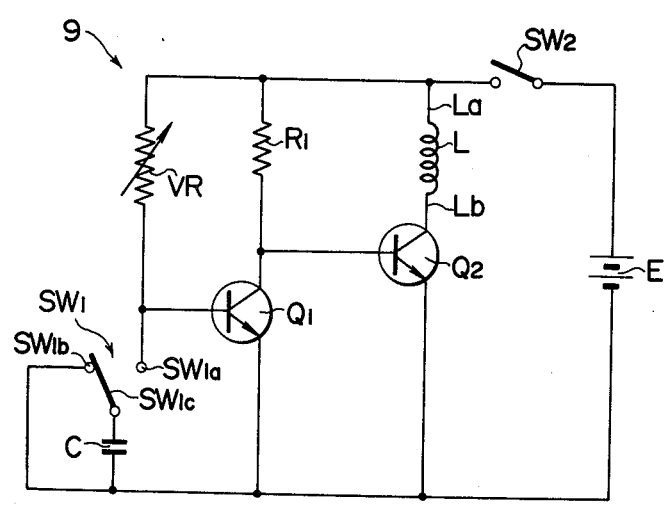
FIG. 8 is a circuit diagram of the shutter drive circuit of the electromagnetic shutter apparatus.

Referring to FIG. 8 for a moment, the circuit 9 comprises a time constant circuit including an integrator circuit formed by a photometric, light receiving element VR and capacitor C, and including a series circuit of a switching transistor Q1 and resistor R1. The circuit 9 also comprises a shutter drive circuit including the shutter drive coil L and another switching transistor Q2. The other end Lb of the coil L is connected with the collector of the transistor Q2. The transistor Q2 is an NPN transistor having its emitter connected with the negative terminal of the source E. The main switch SW2 is adapted to be closed in ganged relationship with a shutter release operation, and the junction between the element VR and resistor R1 is connected with the junction between the coil L and one contact of the switch SW2. The other end of the resistor R1 is connected with the base of transistor Q2 and is also connected with the collector of the transistor Q1. The element VR may comprise a photoelectric transducer element such as CdS element which has its resistance decreased upon irradiation, or may comprise a manually settable variable resistor. At its one end, the element VR is connected with the base of transistor Q1 and one stationary contact SW1a of a shutter release switch SW1, which also includes another stationary contact SW1b which is connected with one terminal of capacitor C, the other end of which is in turn connected with the movable contact SW1c. The emitter of transistor Q1 and the contact SW1b as well as one terminal of capacitor C are connected with the negative terminal of the source E.

Figure 3:
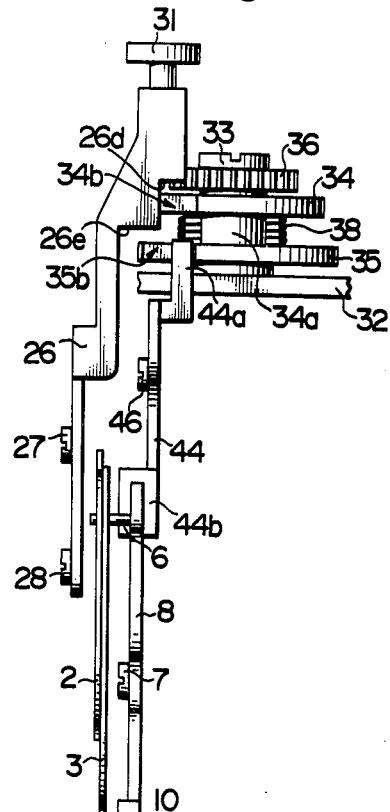
FIG. 3 is a side elevation of the control apparatus shown in FIG. 1.
Figure 4:
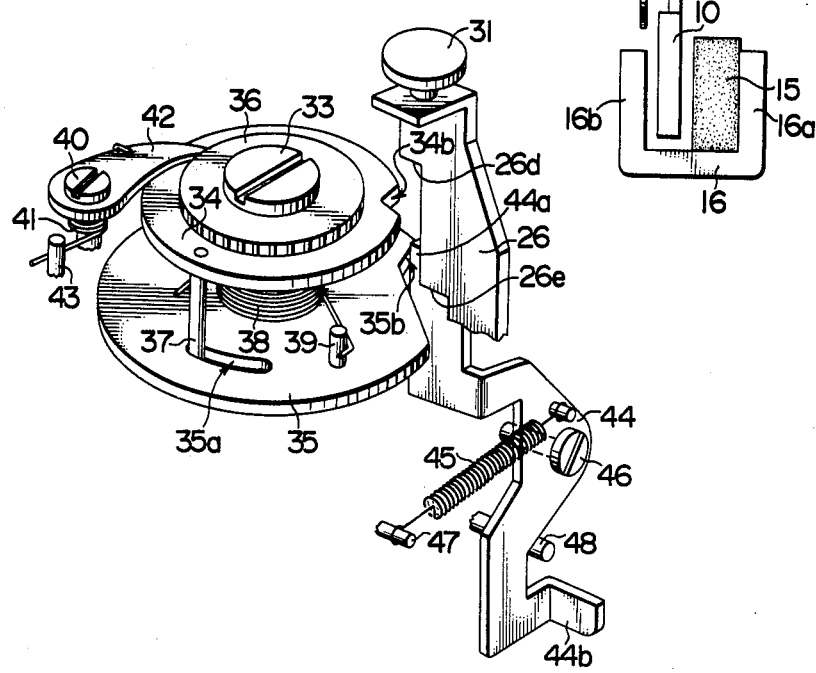
FIG. 4 is a perspective view of a first and a second notched disc and their associated mechanism which are used in the control apparatus of FIG. 1.
Figure 5:
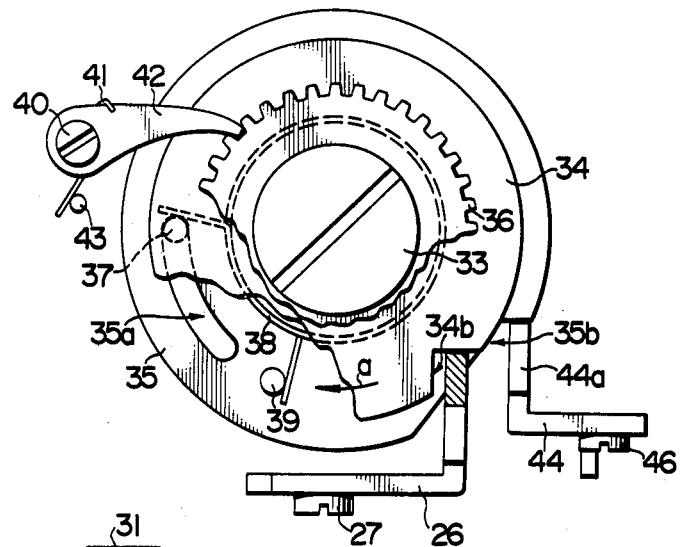
FIG. 5 is an enlarged plan view of FIG. 4.

Referring back to FIG. 1, the movable contact SW1c of the shutter release switch SW1 has its free end disposed below a shutter release member 26, which is slidable in the vertical direction by the sliding engagement between a pair of vertically spaced elongate slots 26a, 26b formed therein with stationary pins 27, 28, respectively. On its left-hand side, the member 26 has an extension 26c, and a coiled spring 30 extends between the extension 26c and stationary pin 29 to urge the member 26 to move upward. The upper portion of the member 26 is folded so as to be at right angles to the lower portion thereof. Referring to FIG. 3, the upper portion of the member 26 is formed with a pair of steps 26d, 26e. The uppermost portion of the member 26 is folded to extend in the vertical direction and fixedly carries a shutter button 31. It is to be noted that the steps 26d, 26e are disposed in opposing relationship with a first and a second notched discs 34, 35, respectively, which are rotatably mounted on a shaft 33 fixedly mounted on a stationary support plate 32.

The first notched disc 34 is mounted on the shaft 33 in an integral manner with a gear 36 which is adapted to rotate in interlocked relationship with a film winding operation. The disc 34 includes a tubular shank 34a, which provides a spacing from the second disc 35. A pin 37 (see FIG. 4) is fixedly mounted on the lower surface of the first disc 34 and extends through an arcuate slot 35a which is formed in the second disc 35 in concentric relationship with the shaft 33 (see FIGS. 4 and 5). A coiled spring 38 is loosely fitted over the tubular shank 34a and has its one end engaged with the pin 37 and its other end engaged with a pin 39 which is fixedly mounted on the upper surface of the second disc 35. The coiled spring 38 represents a resilient member which provides an operative connection between the first and second notched discs 34, 35. The gear 36 engages a detent claw 42 which is rotatably mounted on a stud 40 and urged by a torsion spring 41 in a direction to engage the gear 36. One end of the spring 41 is engaged with the claw 42 while its other end is anchored to a stationary pin 43.

The first and second discs 34, 35 are formed with notches 34b, 35b, respectively. The notch 35b is engaged by a detent edge 44a formed on one arm of a lever-shaped detent member 44 which is pivotally mounted on a shaft 46 and which is urged to engage the notch by a coiled spring 45 (see FIGS. 1 and 4) extending between said one arm of the detent member 44 and a stationary pin 47. The arm on which the detent edge 44a is formed extends in a plane which is at right angles to the region of the detent member 44 where it is pivotally mounted. The detent member 44 has another arm which is again bent at right angles to extend in a direction opposite from said one arm to form a driven end 44b, which is disposed adjacent to the end 8a of the drive member 8 (see FIG. 1). It is to be noted that a stop 48 limits the extent of angular movement of the detent member 44.

Describing the operation of the apparatus, FIGS. 1 to 5 and 8 show the apparatus when a film winding operation is completed but before a shutter release takes place. The second disc 35 is locked by the detent member 44. As a result of the rotation of the gear 36 in the direction indicated by an arrow a shown in FIG. 5 in interlocked relationship with the film winding operation, the pin 37 fixedly mounted on the first disc 34 engages the left-hand edge, as viewed in FIGS. 4 and 5, of the elongated arcuate slot 35a formed in the second disc 35, thus charging the coiled spring 38. At this time, the notches 34b, 35b assume respective positions in which they permit the downward movement of the steps 26d, 26e when the shutter release member 26 is depressed subsequently.

Since the shutter release member 26 is not yet depressed, the movable contact SW1c is thrown to its contact SW1b, and the main switch SW2 remains open. Under this condition, the coil L is not energized, and remains attracted toward the S-pole of the permanent magnet 15. The shutter drive member 8 maintains both shutter blades 2, 3 closed, and consequently, the optical path of a taking lens 49, which is shown in phantom line in FIG. 1, remains closed.

Figure 6:
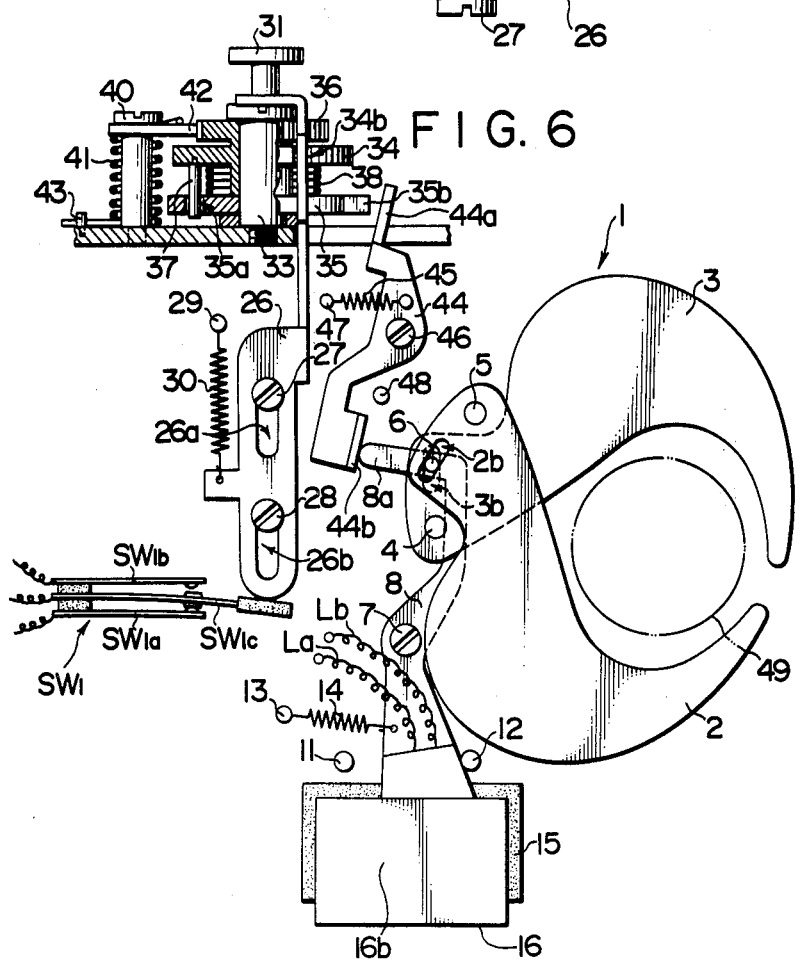
FIG. 6 is a front view of the control apparatus shown in FIG. 1 after the shutter is released.

When a shutter release operation takes place by depressing the shutter button 31 as shown in FIG. 6, the release member 26 moves down to close the power switch SW2 initially. Transistor Q1 is turned on while transistor Q2 remains off, preventing a current flow through coil L. When the release member 26 is depressed further down, the movable contact SW1c of the shutter release switch SW1 is switched to the other stationary contact SW1a, whereby capacitor C is connected with the source E through the element VR. Thereupon, the potential at the base of transistor Q1 decreases to turn it off, while transistor Q2 is turned on to permit a current flow through the coil L. The resulting flux from the coil interacts with the permanent magnet 15, whereby it is repelled from the S-pole and attracted by the N-pole of the permanent magnet 15. Thus the drive member 8 rotates counter-clockwise about the shaft 7 to open both shutter blades 2, 3. As a consequence, the optical path of the taking lens 49 is opened as shown in FIG. 6, initiating an exposure process.

Figure 7:
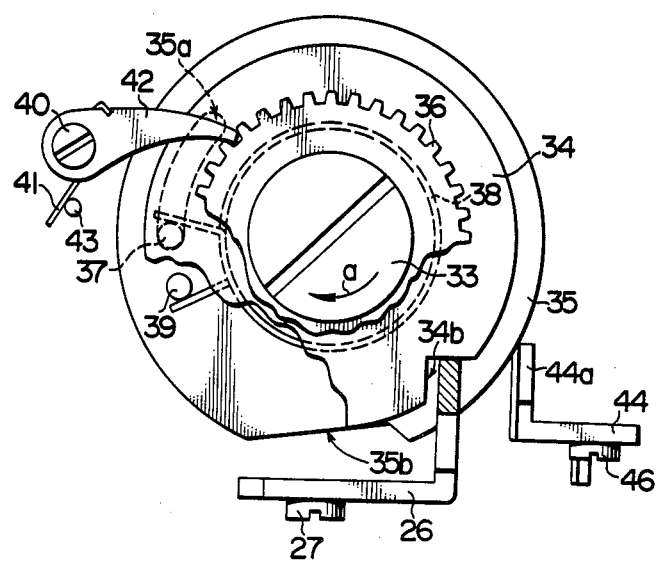
FIG. 7 is an enlarged plan view of part of the control apparatus shown in FIG. 1, illustrating the operation thereof subsequent to the shutter release.

When the drive member 8 moves angularly in this manner, its end 8a displaces the driven end 44b of the detent member 44 against the spring 45 to cause the detent member 44 to rotate clockwise about the stud 46, whereby the detent edge 44a is moved away from the notch 35b formed in the second disc 35. As a consequence, the second disc 35 rotates in the direction of the arrow a under the resilience of the charged spring 38 until the right-hand edge of the slot 35a is engaged with the pin 37 as shown in FIG. 7. If the shutter release member 26 remains depressed at this time, the second disc 35 assumes a standby position maintaining the abutment against it until the depression of the member 26 is terminated to move the step 26e upwardly from the second disc 35, whereupon the latter continues the described rotation until the right-hand edge of the slot 35a abuts against the pin 37 where its rotation ceases. When the second disc 35 has moved in this manner, a subsequent depression of the shutter release member 26 is blocked by the abutment of the step 26e against the disc, thereby preventing another shutter release operation during the film exposure process and before the next film winding takes place. In other words, the double exposure is avoided. While the shutter release member 26 remains depressed, the first disc 34 is locked by the engagement of its notch 34b with the member 26, thus preventing a film winding operation from occurring during the film exposure.

After the shutter blades 2, 3 open, the photometric resistance VR will exhibit a reduced resistance, and when the capacitor C is charged, transistor Q1 conducts, while transistor Q2 is rendered non-conductive, deenergizing the coil L. Thereupon, it is attracted by the S-pole of the permanent magnet 15, returning the drive member 8 to its initial position and closing the shutter blades 2, 3. This completes one cycle of taking a picture. The shutter release member 26 is then released and moves back to its up position. When the next film winding takes place, the gear 36 rotates in the direction of the arrow a, and since the first disc 34 and pin 37 rotate in the same direction, the second disc 35 is also driven in the same direction through the spring 38. Upon rotation of the second disc 35 through substantially one revolution, it is locked by the detent member 44 which has been maintained in bearing engagement with the periphery thereof. The first disc 34 continues to rotate with the gear 36 until the pin 37 thereon abuts against the left-hand edge of the slot 35a, thus charging the spring 38. When the process is terminated, the assembly returns to the position shown in FIGS. 1 to 5 and 8, and thus is ready to take another picture. When the film winding has been completed in this manner, the rotation of the first disc 34 is blocked by the second disc 35 through the pin 37 and slot 35a, and the rotation of the gear 36 is no longer permitted, thus disabling any further winding of an unexposed film.

Figure 9:
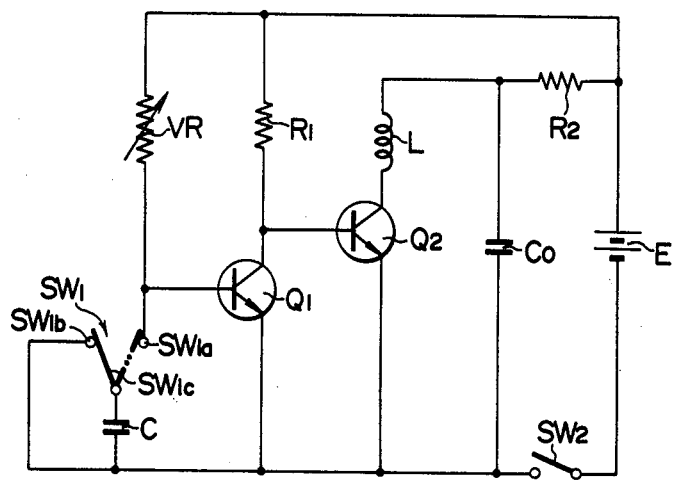
FIG. 9 is a circuit diagram of another form of shutter drive circuit.

FIG. 9 shows the shutter drive circuit which may be used in the electromagnetic shutter apparatus of the invention. Specifically, the circuit comprises a capacitor $C_O$ connected in series with resistor R2 and switch SW2 across a d.c. source E. A series combination including a shutter drive coil L and a switching transistor Q2 is connected in shunt with the capacitor. In other respects, the circuit is constructed in a similar manner to the shutter drive and control circuit shown in FIG. 8, and therefore corresponding parts are designated by like reference characters without repeating their description.

With the circuit arrangement of FIG. 9, a shutter release operation closes the power switch SW2, whereupon capacitor $C_O$ is charged through resistor R2 to a voltage which is close to the terminal voltage of the source E. Subsequently, the movable contact SW1c of the shutter release switch SW1 is thrown from stationary contact SW1b to the other stationary contact SW1a, whereupon transistor Q1 is turned off while transistor Q2 is turned on. Thus the shutter drive coil L is connected with the source through resistor R2 and is also connected with the capacitor $C_O$, causing the latter to discharge. As a consequence, the current flow through the coil L is increased to cause a rapid rotation of the shutter drive member 8 until it bears against the stop pin 12, thus rapidly opening the shutter blades 2, 3. After the capacitor $C_O$ has discharged, the current flow through the coil is supplied only from the source E, so that the shutter drive member 8 is maintained in abutment against the stop pin 12 until capacitor $C_O$ is recharged, thus maintaining the shutter blades 2, 3 in their open position. When capacitor C is charged to a predetermined level, transistor Q1 is turned on while transistor Q2 is turned off to deenergize the coil L, whereupon the shutter drive member 8 is driven into abutment against the stop pin 11 under the resilience of the spring 14, thus closing the shutter blades 2, 3. Subsequently, the release member 26 is raised upward, whereby the movable contact SW1c is returned to the stationary contact SW1b, causing capacitor $C_O$ to be discharged therethrough. Subsequently, the power switch SW2 is returned to its open position.

Figure 10:
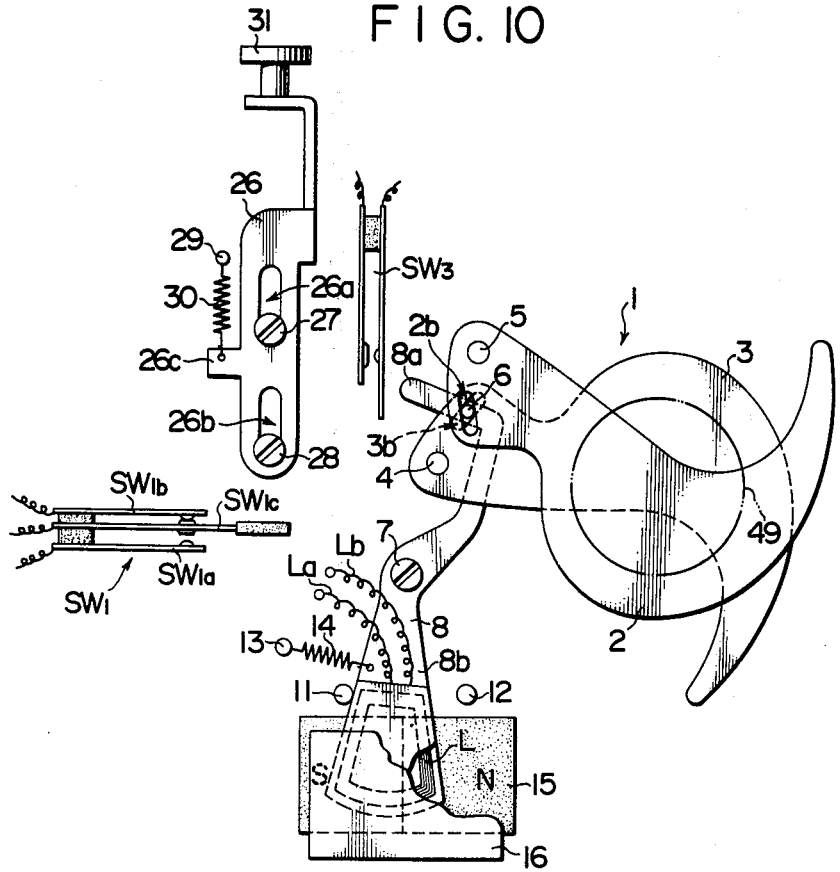
FIG. 10 is a front view of the electromagnetic shutter apparatus including a switch which operates the shutter drive and control circuit.

A shutter drive and control circuit which is used in the electromagnetic shutter apparatus of the invention will now be described. This circuit includes a switch SW3 which is operated as the shutter is opened. Referring to FIGS. 10 and 11, the switch SW3 is closed when the shutter drive member 8 has operated to open the shutter 1. The mechanism including shutter blades 2, 3, shutter drive member 3, shutter drive coil L, permanent magnet 15, shutter release member 26 and release switch SW1 is similar in arrangement to that shown in FIG. 1 for the electromagnetic shutter apparatus. Therefore, similar parts are designated by like reference characters without repeating their description.

The switch SW3 represents a normally open switch which is closed to produce a so-called shutter open signal when the shutter 1 is opened. Specifically, when the coil L is energized to cause the shutter drive member 8 to rotate counter-clockwise about the shaft 7 together with the coil L, the shutter blades 2, 3 are opened and the end 8a of the drive member 8 closes the switch SW3. FIG. 11 shows the shutter open condition.

Figure 12:
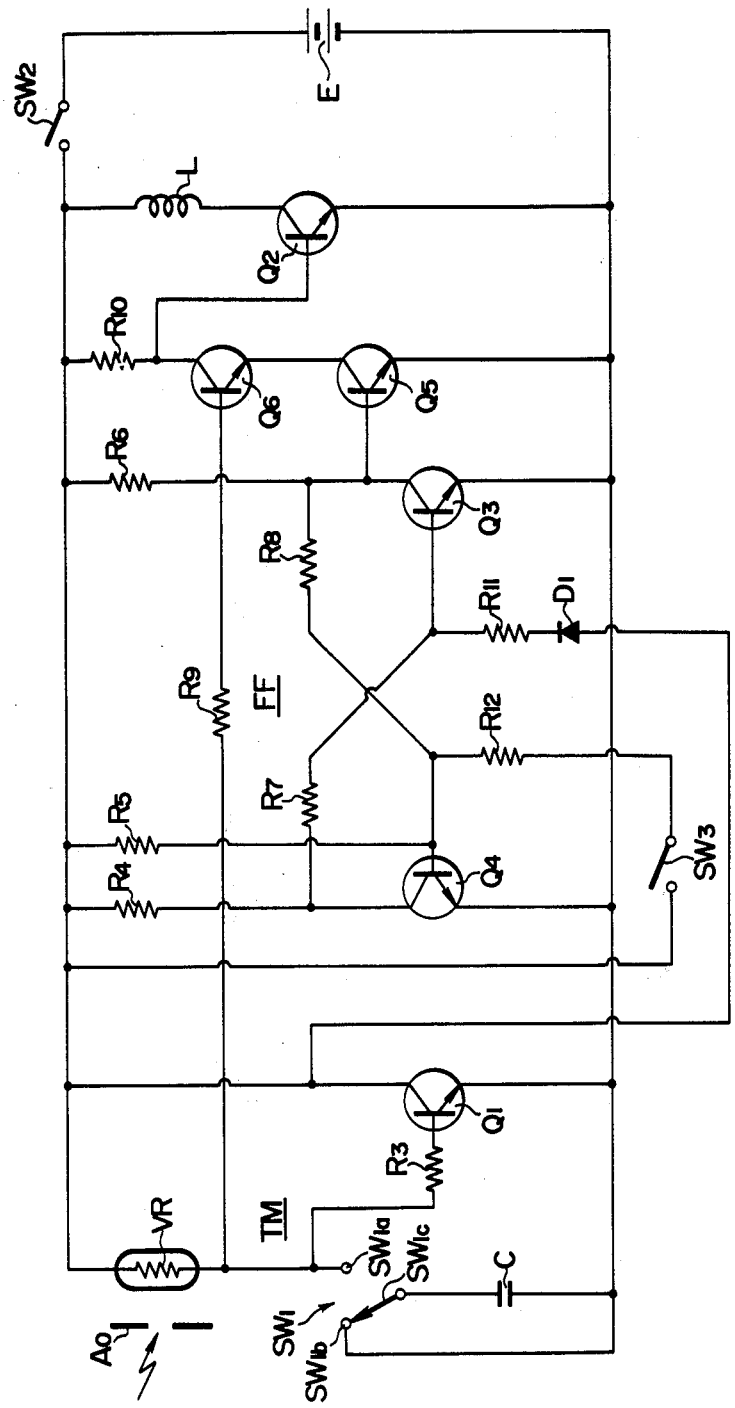
FIG. 12 is a circuit diagram of the shutter drive and control circuit of the invention.

FIG. 12 shows the shutter drive and control circuit including the switch SW3. In this Figure, an integrator circuit comprising a photometric, light receiving element VR and capacitor C forms part of a time constant circuit TM which also includes resistor R3 and an NPN switching transistor Q1. A flipflop FF of the Rhown form is provided including a pair of NPN transistors Q3 and Q4 and resistors R4, R5, R6, R7 and R8. An output from the flipflop controls an NPN transistor Q5, which is connected in series with another NPN transistor Q6 which is in turn controlled by an output from the time constant circuit TM. A series combination of the shutter drive coil L and NPN switching transistor Q2 is connected in shunt with the series combination of transistors Q5 and Q6.

The photometric element VR comprises a photoelectric transducer element such as a CdS element, and is connected with capacitor C when the movable contact SW1c of the release switch SW1 is moved from contact SW1b to the other contact SW1a in response to a shutter release operation. It is to be noted that a diaphragm $A_O$ is disposed in front of the element VP for presetting the values of diaphragm aperture and film speed.

The contact SW1a is connected with the base of transistor Q1 through resistor R3 and is also connected with the base of transistor Q6 through resistor R9. The collector of transistor Q6 is connected through resistor R10 and main switch SW2 with the positive terminal of a power source E, and is also connected with the base of transistor Q2. The collector of transistor Q1 is connected with the base of transistor Q3 through a series combination of diode D1 and resistor R11. It will be noted that the switch SW3 is connected in series with resistor R12 between the base of transistor Q4 in the flipflop FF and the junction between resistor R10 and switch SW2. It will be noted that when either one of series transistors Q5, Q6 is turned off, transistor Q2 is rendered conductive to permit a current flow through the coil L, but that when both transistors Q5, Q6 are turned on, transistor Q2 is turned off to deenergize the coil L.

The operation of the control circuit will be described as it operates in the sequence of taking a picture. Before taking a picture, the main switch SW2 is closed. Since the release switch SW1 has its movable contact SW1c thrown to stationary contact SW1b, transistors Q1 and Q6 are turned on. The conduction of transistor Q1 reduces the base potential of transistor Q3, and transistor Q4 is forwardly biased through resistor R5, so that the flipflop FF assumes a first condition in which transistor Q4 is on and transistor Q3 is off. As a consequence, transistor Q5 is turned on, whereby transistor Q2 is turned off, preventing a current flow through the coil L. Thus, the shutter 1 remains closed, and the parts assume the positions shown in FIG. 10.

When a release button is operated to throw the movable contact SW1c to stationary contact SW1a, both transistors Q1 and Q6 are turned off. The resulting increase in the base potential of transistor Q3 reverses the status of the flipflop FF, turning transistor Q5 off. As a consequence, transistor Q2 is turned on to initiate a current flow through the coil L, allowing the shutter 1 to begin to open. When the release switch SW1 is transferred, the time constant circuit TM begins to operate, and capacitor C begins to charge through the element VR, thus gradually increasing the base potential of transistors Q1 and Q6.

Assume now that the brightness of an object being photographed and preset values of diaphragm aperture and film speed are such that an output from the time constant circuit reaches a given voltage level at which transistors Q1 and Q6 are turned on before the shutter 1 becomes fully open. In this instance, the flipflop FF remains unchanged when transistor Q1 is turned on, so that transistor Q5 remains in its on condition, thereby allowing transistor Q2 to conduct current flow through the coil L. It will thus be seen that the fact that an output from the time constant circuit reaches the given voltage level is not sufficient to interrupt the energization of the coil L. This assures a positive opening of the shutter 1.

When the shutter 1 becomes open and assumes the condition shown in FIG. 11, switch SW3 is closed, whereby the voltage from the source E is applied as an open signal to the base of transistor Q4, causing the flipflop FF to reverse its status, thus turning transistor Q5 on. Since transistor Q6 is already turned on, the conduction of both transistors Q5 and Q6 causes transistor Q2 to turn off, thus deenergizing the coil L to thereby close the shutter 1. In this manner, it is assured that shutter 1 be opened even though the interval required for the time constant circuit to produce an output of a given voltage level is less than the time required for the mechanical operation to open the shutter 1. The shutter 1 is immediately closed in response to the open signal. Thus, the shutter operates with a minimum exposure period.

In the usual case when the signal from the time constant circuit is produced after a time interval which is longer than the minimum opening time of the shutter 1, the switch SW3 is closed before transistors Q1, Q6 are turned on as a result of the charging of capacitor C causing a reversal of the state of the flipflop FF to maintain transistor Q5 in its on standby condition. When transistor Q6 is turned on in response to the signal from the time constant circuit, transistor Q2 is turned off to deenergize the coil L, thus closing the shutter 1. In this manner, a proper exposure is assured.

The release member may be returned after the shutter is closed. Thereupon the release switch SW1 returns to its original position to discharge capacitor C in preparation to the next process of taking a picture. Various transistors Q1 to Q6 assume their initial condition, namely, transistors Q1, Q4, Q5 and Q6 remain on while transistors Q3 and Q2 remain off.

In the above embodiment, the switch SW3 which produces the open signal has been described as being turned on when the shutter 1 is opened and turned off when the shutter is closed. However, it should be noted that the only requirement is that it is turned on when the shutter is closed and is turned off before the next time a picture is taken. Thus, it may be replaced by a switch which is turned off when the release member is returned or a switch which is turned off during a film winding operation.

Referring to FIGS. 13 to 19, there is shown an embodiment of the multiple exposure apparatus which may be incorporated into the electromagnetic shutter apparatus of the invention. It is to be noted that the electromagnetic shutter apparatus which incorporates the multiple exposure apparatus may be similarly constructed as that shown in FIGS. 1 and 10, and therefore similar parts are designated by like reference characters and will not be described specifically. Also, it is to be noted that the shutter drive and control circuit used in the electromagnetic shutter apparatus may be similarly constructed as that shown in FIG. 8. The only deviation from the previous embodiments is the construction of the shutter release member 26, which is integrally formed with a folded piece 26g (see FIGS. 13 and 15) for blocking the depression of the release member 26 by abutment against a suitable detent member to be described later.

Figure 15:
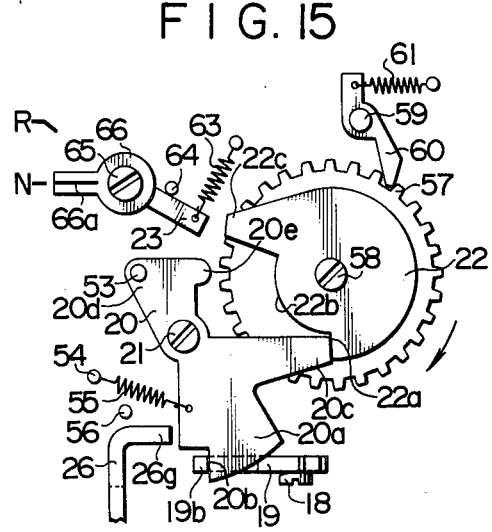

The multiple exposure apparatus is disposed between the bladed shutter 1 and the shutter release member 26 as shown in FIGS. 13 and 15, and comprises a pusher member 19 which is pivotally mounted on a shaft 18. Additionally, the multiple exposure apparatus comprises a detent member 20 pivotally mounted on a shaft 21 and arranged in a horizontal plane above the pusher member 19, and thus at right angles thereto, a returning member 22 disposed adjacent to the detent member 20 for rotation in interlocked relationship with a film winding operation of the film winding mechanism, and a constraining member 23 disposed adjacent to the detent member 20 for preventing the operation of the detent member 20 during a multiple exposure mode.

The pusher member 19 and the shutter drive member 8 are disposed in a common plane, and member 19 is urged to rotate clockwise about the shaft 18 by a spring 51 extending between a downward projection 19c thereof and a stationary pin 24. However, the resulting rotation is normally blocked by the abutment of the projection 19c against a stop pin 52. On its upper portion, the pusher member 19 is provided with a driven end 19a and a locking arm 19b. The driven end 19a is formed on an upward extension of the pusher member and is adapted to be driven by the end 8a of the shutter drive member 8 to cause the pusher member 19 to rotate counter-clockwise about the shaft 18. The locking arm 19b has its end engaged with a step 20b formed in the detent member 20, and normally prevents a rotation of the detent member 20, thus maintaining the detent member 20 in locking engagement with the returning member 22 to thereby block a film winding operation.

As shown in FIG. 15, the detent member 20 includes a first arm 20a extending over the pusher member 19 and in which the step 20b is formed, a second arm 20c extending toward the returning member 22 and having its free end engaged with a notched step 22a formed in the member 22, a third arm 20d extending toward and below the constraining member 23 and fixedly carrying a pin 53 on its free end which extends into the path of rotation of the constraining member 23, and a semi-circular tab 20e which is formed on the edge of the third arm 20d which faces the returning member 22. A spring 55 extends between the first arm 20a and stationary pin 54 to urge the detent member 20 to rotate clockwise about the shaft 21. However, the resulting rotation is blocked by the abutment of the step 20b against the locking arm 19b. Under this condition, the second arm 20c bears against the notched step 22a to prevent a film winding operation. When the detent member 20 is allowed to rotate clockwise about the shaft 21, it rotates until the first arm 20a bears against a stop pin 56, thus disengaging the second arm 20c from the returning member 22. Also the first arm 20a is located below the folded piece 26g on the release member 26, thereby preventing the depression of the member 26 (see FIG. 17).

The returning member 22 is fixedly mounted on a shaft 58 carried by a gear 57 which is adapted to rotate clockwise in response to a film winding operation. It is peripherally formed with a notch 22b which defines the step 22a. On the opposite side of the notch from the step 22a, the member 22 is formed with an outwardly extending return arm 22c, which is effective, during the clockwise rotation of the member 22 through one revolution in response to a film winding operation, to drive the return tab 20e thereby returning the detent member 20 to its initial position by turning it counter-clockwise about the shaft 21 (see FIG. 18). The gear 57 is engaged with a pawl 60 which is urged into engagement between the teeth of the gear 57 by a spring 61, thus preventing a reverse rotation thereof.

The constraining member 23 is in the form of an arm having its one end pivotally mounted on a shaft 62 (FIG. 13). The free end of the arm is engaged by a spring 63, whereby it is urged to rotate counter-clockwise about the shaft 62. However, the resulting rotation is normally prevented by the abutment of its free end against a stop pin 64. In this position, the member 23 is moved out of the path of rotation of the pin 53. The upper end of the shaft 62 is exposed externally of the camera, and a manual changeover knob 66 is integrally mounted on this end by a set screw 65. The changeover knob 66 is inscribed with an index 66a, which can be brought into alignment with an indication "R" provided on the outer surface of the camera to enable a multiple exposure mode, by turning the knob 66. Specifically, when the knob 66 is turned to bring the index 66a into alignment with the indication "R" against the resilience of the spring 63, the constraining member 23 is displaced into engagement with the pin 53, thereby constraining the angular movement of the detent member 20. As a result, the depression of the release member 26 can be repeated as many times as desired. However, the constraining member 23 remains stationary at the position in which it bears against the stop pin 64 under the resilience of the spring 63. In this position of the constraining member, the index 66a on the knob 66 is aligned with an indication "N" on the camera surface, indicating that the camera is in a mode other than the multiple exposure mode.

Figure 14:
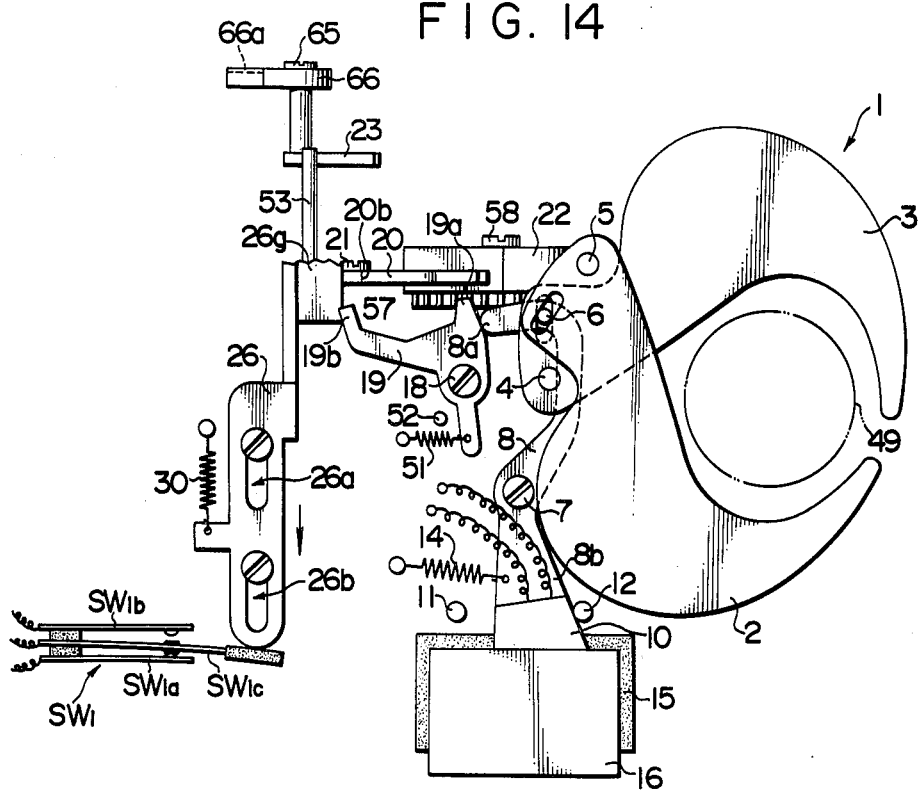
FIG. 14 is a similar front view of the apparatus shown in FIG. 13, illustrating the operative condition thereof.

In operation, the knob 66 may be manually operated to bring the index 66a thereon into alignment with the indication "N" to permit an ordinary photographing operation. Alternatively, it may be operated to bring the index 66a into alignment with the indication "R" to permit a multiple exposure mode as desired. As the shutter release member 26 is depressed when the index 66a is aligned with the indication "N", the shutter drive and control circuit 9 (see FIG. 8) is activated. As the release member 26 is further depressed, the release switch SW1 is changed to the contact SW1a to energize the coil L, whereby the drive member 8 is rotated counter-clockwise about the shaft 7 to open the shutter 1, as shown in FIG. 14. When the drive member 8 opens the shutter 1, its end 8a drives the driven end 19a of the pusher member 19, which is therefore rotated counter-clockwise about the shaft 18. As shown in FIG. 16, the detent member 20 follows the angular movement of the pusher member 19 under the resilience of the spring 55, by turning clockwise about the shaft 21. The detent member 20 comes to a stop upon abutment against the side of the folded piece 26g of the release member 26.

Subsequently when the photographing operation is terminated to return the release member 26 upward under the resilience of the spring 30, the detent member 20 rotates further clockwise until its first arm 20a bears against the stop pin 56. In this angular position, the first arm 20a is located below the folded piece 26g, as shown in FIG. 17, thereby preventing a shutter release operation. However, under this condition, the second arm 20c is unlocked from the step 22a, so that a film winding operation can take place. A film winding operation causes the winding gear 57 and the returning member 22 to rotate clockwise through one revolution, and during their rotation, the return tab 20e of the detent member 20 which extends into the path of rotation of the return arm 22c is angularly driven by the return arm 22c to cause a counter-clockwise rotation of the detent member 20 about the shaft 21, as shown in FIG. 18. By engaging the step 20b with the locking arm 19b of the pusher member 19, the detent member is returned to its initial position shown in FIGS. 13 and 15 as is the pusher member 19. A subsequent shutter release operation is now possible under this condition.

Figure 19:
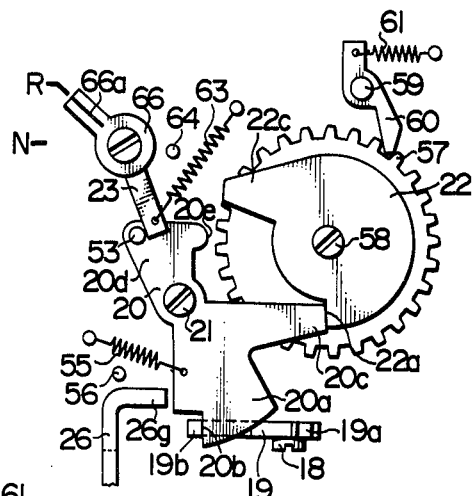

Whenever a multiple exposure mode is desired, the knob 66 is manually turned to bring the index 66a into alignment with the indication "R" before initiating a shutter release operation. Upon shutter release, a shutter operation takes place in the sequence mentioned above. As shown in FIG. 19, the detent member 20 is prevented from rotating by the engagement of the constraining member 23 with the pin 53, and therefore cannot follow the rotation of the pusher member 19, maintaining the returning member 22 in its stationary position where it blocks a winding operation of the film winding mechanism. As a consequence, upon termination of the shutter operation, no film winding can take place, thus permitting another shutter release to be performed. The same film surface can be exposed as many times as desired as long as the index 66a on the knob 66 is maintained in alignment with the indication "R". When the knob 66 is released, the constraining member 23 and knob 66 return to their initial position in which the index 66a is aligned with the indication "N" under the resilience of spring 63, thus disabling the multiple exposure. In this manner, an inadvertent multiple exposure is positively avoided by disabling it whenever the knob 66 is released. During the multiple exposure mode, the film winding mechanism is locked by the detent member 20, thus avoiding the likelihood of movement of the film.

Figure 20:
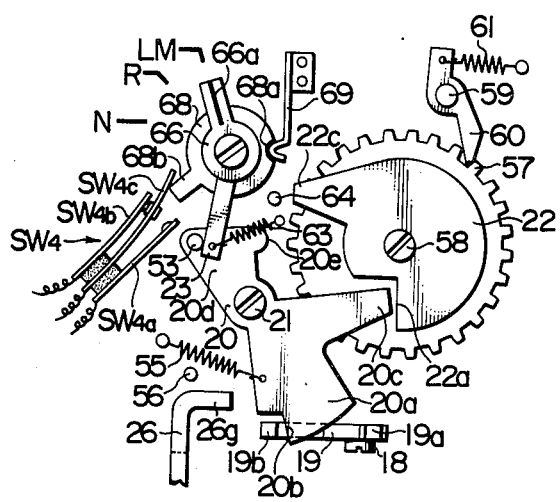
FIG. 20 is a plan view of another embodiment of the multiple exposure apparatus of the invention.
Figure 21:
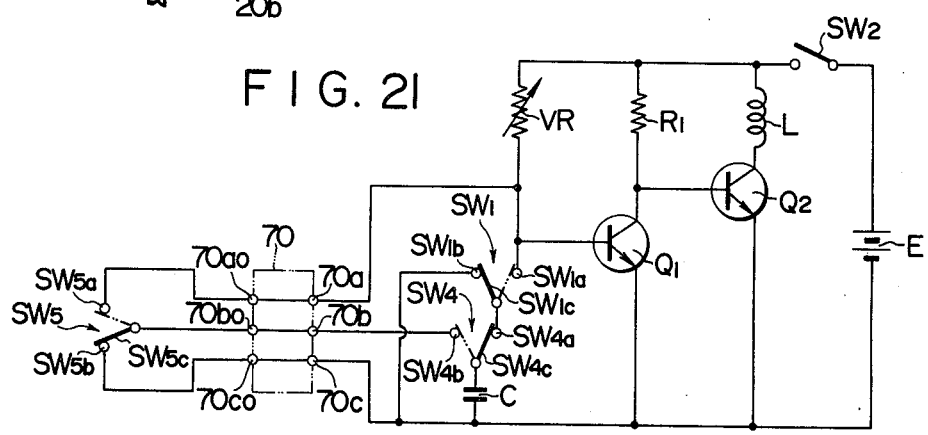
FIG. 21 is a circuit diagram of the electromagnetic shutter drive circuit which is used in the apparatus of FIG. 20.

FIGS. 20 and 21 show another embodiment of the multiple exposure apparatus. In this embodiment, the constraining member 23 can be switched by the knob 66 between three positions, namely, position "N" where a normal single exposure is enabled, position "R" where a multiple exposure mode is enabled and from which it can be automatically returned to the position "N" whenever the knob is released, and position "LM" where the constraining member 23 is locked by a click stop mechanism to permit a multiple exposure if the knob is released.

This embodiment differs from the previous embodiment in that the constraining member 23 is integrally provided with a disc 68 having a click stop recess 68a and a switch actuator 68b, with a leaf spring 69 engageable with the recess 68a, as shown in FIG. 20. In addition, as shown in FIG. 21, a changeover switch SW4 which is actuated by the switch actuator 68b is connected between the release switch SW1 and capacitor C, and there is also provided a remote control switch SW5 which can be connected in parallel with the release switch SW1 so as to permit a remote control.

The changeover switch SW4 has its one stationary contact SW4a connected with the movable contact SW1c and its other stationary contact SW4b connected with a terminal 70b of a remote switch connector 70. The movable contact SW4c of the switch is connected with one terminal of capacitor C, the other end of which is connected with the negative terminal of the source E. The remote switch connector 70 includes inner terminals 70a, 70b, 70c and corresponding outer terminals 70a$_O$, 70b$_O$, 70c$_O$ which are internally connected with the inner terminals 70a to 70c, respectively. The inner terminal 70a is connected with the contact SW1a and the inner terminal 70c is connected with the negative terminal of the source E. The remote control switch SW5 is connected with the connector 70. Specifically, one stationary contact SW5a of the switch SW5 is connected with terminal 70a$_O$, its movable contact SW5c with terminal 70b$_O$ and the other stationary contact SW5b with terminal 70c$_O$.

The movable contact SW4c of the switch SW4 is normally maintained in engagement with contact SW4a, so that capacitor C is normally short-circuited by a path including movable contact SW4c, contact SW4a, movable contact SW1c and contact SW1b. However, when the switch SW4 is changed, capacitor is short-circuited through a path including movable contact SW4c, stationary contact SW4b, terminals 70b, 70b$_O$ of connector 70, movable contact SW5c and stationary contact SW5b. As shown in FIG. 20, when the knob 66 is turned to bring the index 66a into alignment with the indication "LM", the actuator 68b drives the movable contact SW4c into contact with the stationary contact SW4b.

With the described arrangement, when the movable contact SW5c of the remote control switch SW5 is thrown to its stationary contact SW5b, a single exposure is enabled upon shutter release, by locating the knob 66 in alignment with the indication "N". When the shutter release takes place while maintaining the knob 66 in alignment with the indication "R", a multiple exposure is permitted. When the knob 66 is released while it is located at the indication "R", it automatically returns to the position aligned with the indication "N" under the resilience of the spring 63.

However, when the knob 66 is turned to bring the index into alignment with the indication "LM", the recess 68a in the disc 68 is engaged by the spring 69, which maintains the disc 68 in this position and the switch actuator 68b drives the movable contact SW4c into engagement with the stationary contact SW4b, as shown in FIG. 20. Consequently, the knob 66 can be temporarily maintained in such position if it is released, and a shutter release operation can be repeated as many times as desired by changing the movable contact SW5c from stationary contact SW5b to the other stationary contact SW5a of the switch SW5. In this manner, a multiple exposure can be remotely controlled.

What is claimed is:

1. A film winding and shutter release control apparatus for an electromagnetic shutter apparatus for cameras which includes a shutter drive and control circuit for energizing a shutter drive coil in response to a shutter release operation to open a shutter by the electromagnetic cooperation between the coil and a permanent magnet and for automatically controlling an exposure period by a time constant circuit including a photometric, light receiving element; the control apparatus comprising a shutter release member adapted to be depressed by a shutter release operation to operate the shutter drive and control circuit, a first notched disc disposed for rotation in interlocked relationship with a film winding operation, a notch formed in the first disc at a position adjacent to the position occupied by the shutter release member for permitting a release operation of the member while it is being locked thereby, a resilient member having its one end connected with the first notched disc and adapted to be charged as the latter rotates, a second rotatable notched disc connected with the other end of the resilient member, a detent member interlocked with a shutter operation and normally preventing the second disc from rotating and unlocking the second disc as the shutter is opened, and another notch formed in the second disc at a position adjacent to the position occupied by the shutter release member to permit a release operation of the shutter release member while it is being locked thereby.

2. Apparatus according to claim 1 in which the shutter release member is formed with steps which are adapted to engage the first and the second notched disc, respectively, the steps cooperating with said first and second discs to prevent the shutter release member from being depressed whenever the resilient member is not charged.

3. Apparatus according to claim 2 in which the second notched disc is further provided with an arcuate slot which is engaged by a depending pin from the first disc, the second disc rotating through a given angle relative to the first disc under the resilience of the charged resilient member until the notch therein engages the release member when the second disc is unlocked upon depression of the release member.

4. Apparatus according to claim 2 in which the resilient member is in the form of a coiled spring which operatively connects the first and the second disc.

5. Apparatus according to claim 1 in which the first and the second notched disc are disposed in coaxial relationship, the respective notches being located opposite to the shutter release member to permit a release operation thereof only when the resilient member which connects the discs together is charged.

* * * * *